US012395940B2

(12) United States Patent
Ibrahim et al.

(10) Patent No.: US 12,395,940 B2
(45) Date of Patent: Aug. 19, 2025

(54) HYBRID PDSCH FOR OUT-OF-BAND EARTH STATION INTERFERENCE CANCELATION

(71) Applicant: Samsung Electronics Co., Ltd., Suwon-si (KR)

(72) Inventors: Ahmed Atef Ibrahim Ibrahim, Plano, TX (US); Hao Chen, Plano, TX (US); Namjeong Lee, Suwon-si (KR); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/529,164

(22) Filed: Nov. 17, 2021

(65) Prior Publication Data

US 2023/0019046 A1     Jan. 19, 2023

Related U.S. Application Data

(60) Provisional application No. 63/221,788, filed on Jul. 14, 2021.

(51) Int. Cl.
*H04W 52/14* (2009.01)
*H04B 7/06* (2006.01)
(Continued)

(52) U.S. Cl.
CPC ........ *H04W 52/143* (2013.01); *H04B 7/0626* (2013.01); *H04L 5/0048* (2013.01); *H04W 52/12* (2013.01); *H04W 52/241* (2013.01)

(58) Field of Classification Search
CPC .. H04B 7/0626; H04B 7/0695; H04B 7/0456; H04B 7/0639; H04B 7/0486;
(Continued)

(56) References Cited

U.S. PATENT DOCUMENTS 8,792,881 B2   7/2014   Koo et al.
9,674,801 B2   6/2017   Farmanbar et al.
(Continued)

FOREIGN PATENT DOCUMENTS

KR          10-2246764 B1    4/2021
KR     10-2021-0094282 A     7/2021
(Continued)

OTHER PUBLICATIONS

International Search Report and Written Opinion issued Mar. 25, 2022 regarding International Application No. PCT/KR2021/018527, 9 pages.

(Continued)

*Primary Examiner* — Golam Sorowar

(57) ABSTRACT

Methods and apparatuses in a wireless communication system. A base station (BS) includes a transceiver and a processor. The processor is configured to receive, via the transceiver, a channel state information (CSI) report from at least one user equipment (UE). The processor is also configured to configure CSI-reference signal (RS) resources for the at least one UE. The processor is further configured to, based on the CSI report from the at least one UE, perform one of: set a transmission power to full power for transmission in a physical downlink shared channel (PDSCH); or apply a back-off percentage to the transmission power in the PDSCH.

27 Claims, 13 Drawing Sheets

(51) Int. Cl.
*H04L 5/00* (2006.01)
*H04W 52/12* (2009.01)
*H04W 52/24* (2009.01)

(58) Field of Classification Search
CPC .... H04B 7/0469; H04B 7/088; H04B 7/0632; H04B 7/0478; H04B 7/0617; H04B 7/0417; H04B 7/024; H04B 7/063; H04B 7/0413; H04B 7/0482; H04B 7/0404; H04B 7/0628; H04B 7/0408; H04B 7/0452; H04B 17/327; H04L 5/0048; H04L 5/0057; H04L 5/0053; H04L 5/0051; H04L 5/005; H04L 1/0026; H04L 5/0094; H04L 5/0023; H04L 5/0007; H04L 1/0028; H04L 5/0035; H04L 1/08; H04L 1/1861; H04L 25/0226; H04L 1/1812; H04L 5/001; H04L 5/0044; H04L 1/0009; H04L 25/03923; H04L 5/0055; H04W 72/23; H04W 72/21; H04W 24/10; H04W 72/046; H04W 52/146; H04W 72/0446; H04W 24/08; H04W 72/542; H04W 52/42; H04W 72/0453; H04W 4/70; H04W 52/367; H04W 16/28; H04W 80/08; H04W 72/51; H04W 88/02; H04W 88/08; H04W 52/242; H04W 74/0833
See application file for complete search history.

(56) References Cited

U.S. PATENT DOCUMENTS

| | | | |
|---|---|---|---|
| 10,044,487 B2 | 8/2018 | Gomadam et al. | |
| 10,142,878 B1* | 11/2018 | Singh | H04W 36/24 |
| 11,838,766 B2* | 12/2023 | Wang | H04W 16/18 |
| 2013/0114425 A1 | 5/2013 | Sayana et al. | |
| 2014/0177532 A1 | 6/2014 | Kim et al. | |
| 2014/0334327 A1* | 11/2014 | Wang | H04W 24/02 370/252 |
| 2015/0009838 A1 | 1/2015 | Sun et al. | |
| 2015/0071191 A1* | 3/2015 | Kim | H04L 5/0035 370/329 |
| 2015/0098346 A1 | 4/2015 | Guo et al. | |
| 2016/0353424 A1* | 12/2016 | Stirling-Gallacher | H04B 7/0626 |
| 2018/0160372 A1 | 6/2018 | Benjebbour et al. | |
| 2019/0149256 A1 | 5/2019 | Davydov | |
| 2020/0028558 A1* | 1/2020 | Yerramalli | H04B 7/0456 |
| 2021/0050891 A1* | 2/2021 | Park | H04B 7/0695 |
| 2021/0051653 A1* | 2/2021 | Park | H04W 72/21 |
| 2021/0120499 A1 | 4/2021 | Su | |
| 2021/0235280 A1 | 7/2021 | Naik et al. | |
| 2021/0409989 A1* | 12/2021 | Raghavan | H04W 72/044 |
| 2022/0078801 A1* | 3/2022 | Huang | H04W 76/15 |
| 2022/0263553 A1* | 8/2022 | Qiang | H04B 7/0626 |
| 2022/0271809 A1* | 8/2022 | Raghavan | H04B 7/0617 |

FOREIGN PATENT DOCUMENTS

| | | |
|---|---|---|
| WO | 2017008235 A1 | 1/2017 |
| WO | 2020260929 A1 | 12/2020 |

OTHER PUBLICATIONS

Extended European Search Report issued Jul. 31, 2024 regarding Application No. 21950288.7, 9 pages.
Communication pursuant to Article 94(3) EPC issued Oct. 28, 2024 regarding Application No. 21950288.7, 5 pages.

* cited by examiner

HYBRID PDSCH FOR OUT-OF-BAND EARTH STATION INTERFERENCE CANCELATION

CROSS-REFERENCE TO RELATED APPLICATIONS AND CLAIM OF PRIORITY

The present application claims priority to U.S. Provisional Patent Application No. 63/221,788, filed on Jul. 14, 2021. The content of the above-identified patent document is incorporated herein by reference.

TECHNICAL FIELD

The present disclosure relates generally to a diverse networks and, more specifically, the present disclosure relates to a hybrid physical downlink shared channel for out of band Earth Station interference cancelation.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency, coverage, and quality of service are of paramount importance.

SUMMARY

The present disclosure generally relates to diverse networks and, more specifically, the present disclosure relates to a hybrid physical downlink shared channel for out of band Earth Station interference cancelation.

In another embodiment, a base station (BS) in a wireless communication system is provided. The BS includes a transceiver and a processor. The processor is configured to receive, via the transceiver, a channel state information (CSI) report from at least one user equipment (UE). The processor is also configured to configure CSI-reference signal (RS) resources for the at least one UE. The processor is further configured to, based on the CSI report from the at least one UE, perform one of: set a transmission power to full power for transmission in a physical downlink shared channel (PDSCH); or apply a back-off percentage to the transmission power in the PDSCH.

In one embodiment, a method of a base station (BS) a wireless communication system is provided. The method includes receiving, via a transceiver, a channel state information (CSI) report from at least one user equipment (UE). The method also includes configuring CSI-reference signal (RS) resources for the at least one UE. The method further includes, based on the CSI report from the at least one UE, performing one of: setting a transmission power to full power for transmission in a physical downlink shared channel (PDSCH); or applying a back-off percentage to the transmission power in the PDSCH.

In yet another embodiment, a non-transitory computer readable medium is provided. The non-transitory computer readable medium includes instructions that, when executed by at least one processor, are configured to cause the at least one processor to: receive a channel state information (CSI) report from at least one user equipment (UE); configure CSI-reference signal (RS) resources for the at least one UE; and, based on the CSI report from the at least one UE, perform one of: set a transmission power to full power for transmission in a physical downlink shared channel (PDSCH); or apply a back-off percentage to the transmission power in the PDSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, a reference is now made to the following description taken in conjunction with the accompanying drawings, in which like reference numerals represent like parts.

DETAILED DESCRIPTION

Figure 1:
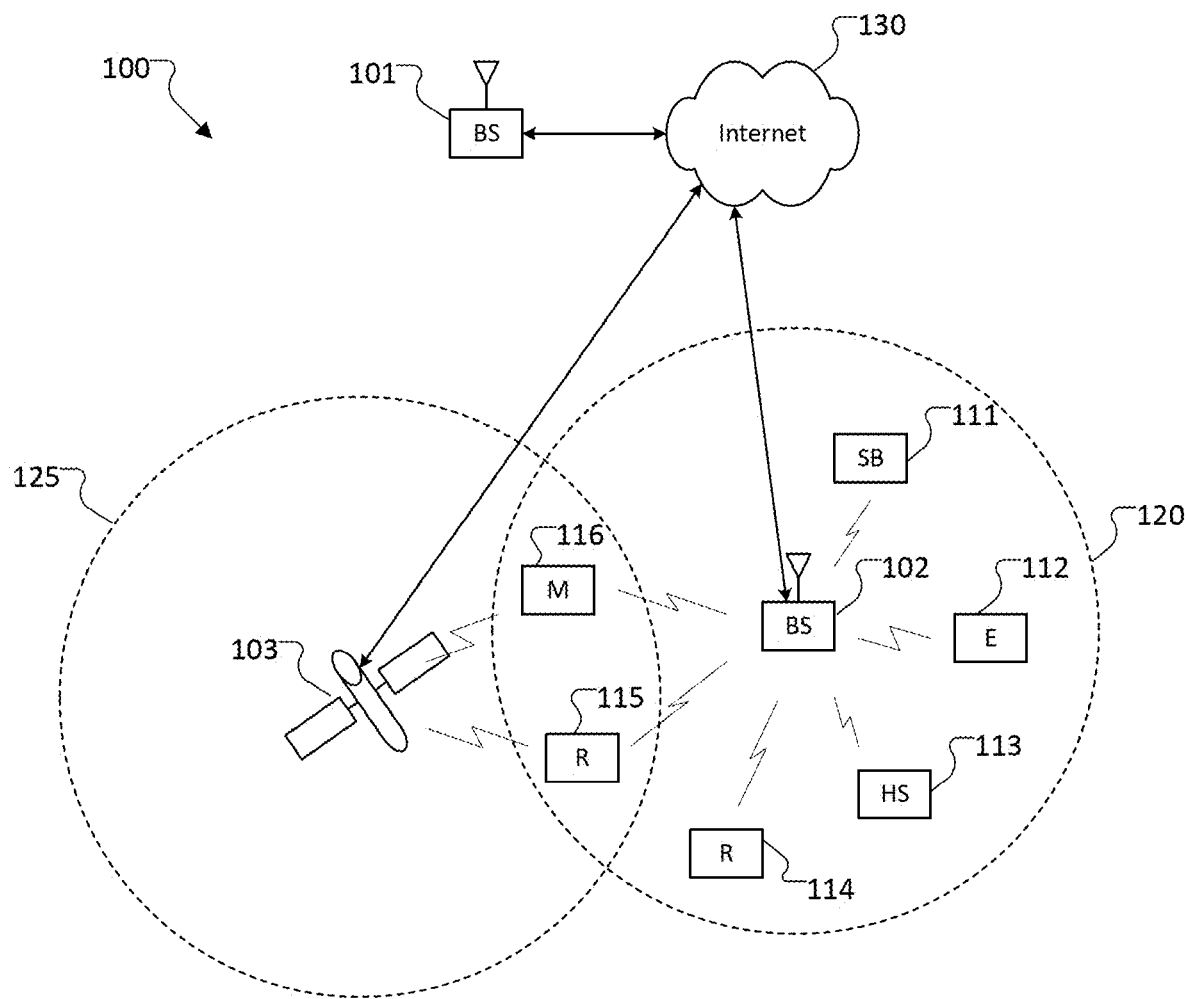
FIG. 1 illustrates an example wireless network according to embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

In many cases, cellular networks are deployment in locations where satellite earth-stations (ES) exist. Cellular operation bands can be adjacent to ES operation band. There are harsh constraints on the amount of interference that ES can tolerate in their band of operation. Even though cellular networks are operating in a different adjacent band, out of band (OOB) emission still affects ES. Hence, transmission back-off is required to avoid OOB interference.

Transmission power back-off deteriorate the throughput performance and reduces network coverage significantly, especially, for edge users who usually operate with lower ranks.

Although PMI restriction is a feature that is supported in standards and we can avoid using the PMIs that are transmitting in the direction of the ES, high-rank beam shape is not guaranteed when it is measure OOB. Limiting the power in a certain direction OOB can only be guaranteed for rank-1 users.

Embodiments of the present disclosure provide a hybrid solution for physical downlink shared channel (Hybrid PDSCH). In certain embodiments, a power reduction is applied for higher-rank users and for rank-1 users and a PMI-restriction is applied where the UE is configured to avoid using certain PMI codewords that will cause interference to ES direction. Embodiments of the disclosed Hybrid PDSCH method handles the mixture between these two modes (PMI-restriction for rank-1 users and power reduction for high-rank users) at a 5G node B (gNB) side to enhance throughput and coverage simultaneously.

Figure 2:
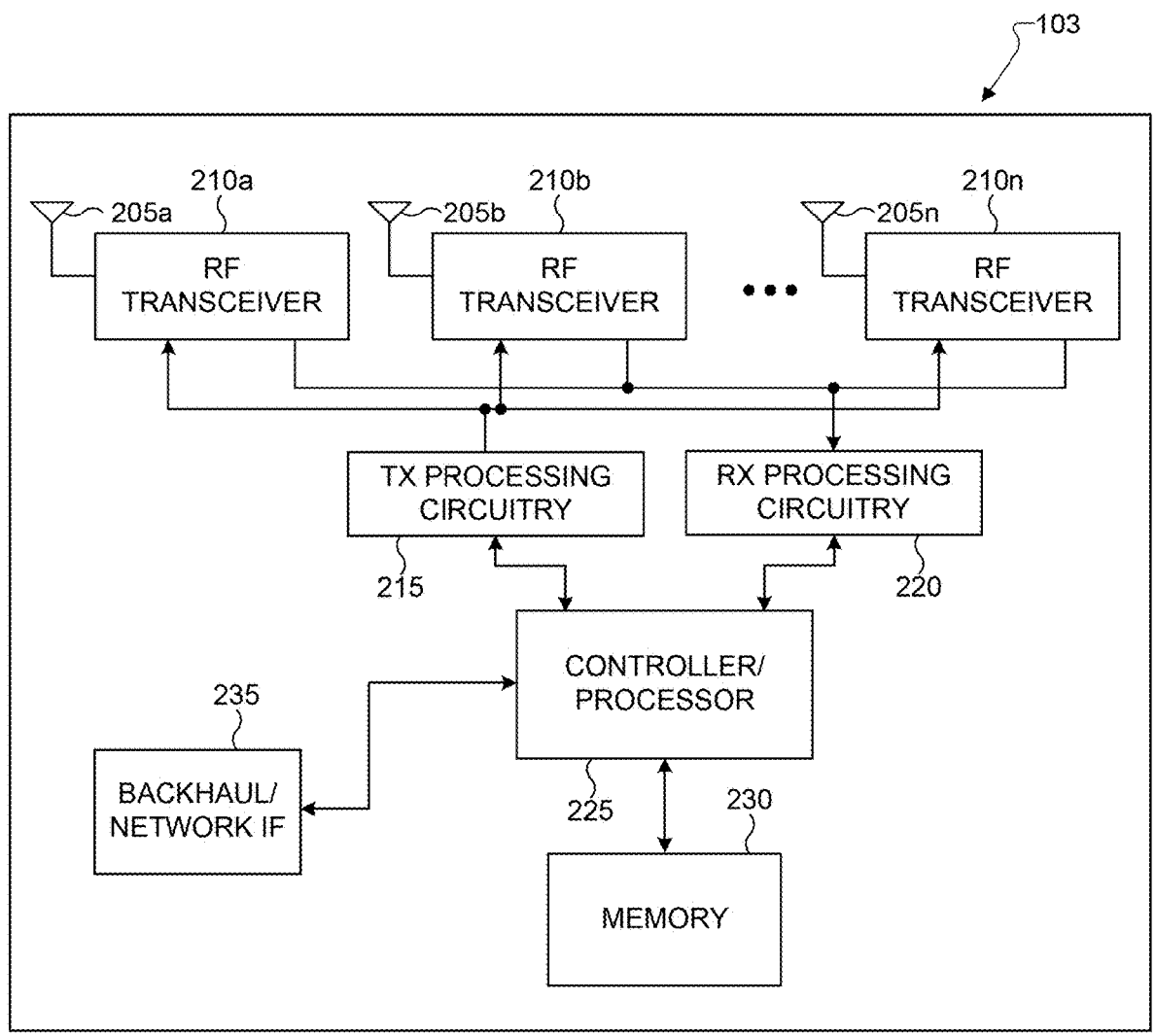
FIG. 2 illustrates an example gNB according to embodiments of the present disclosure.
Figure 3:
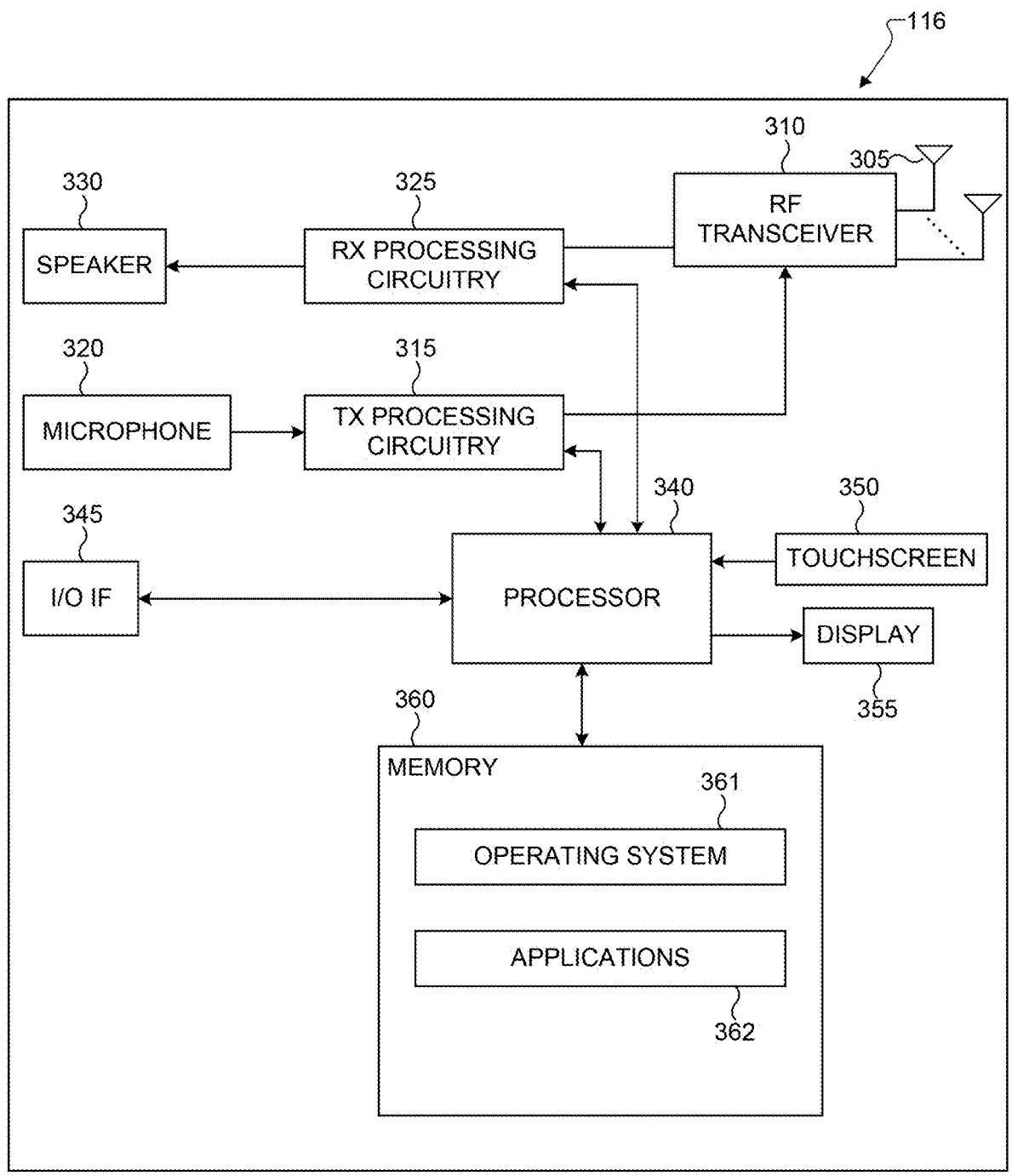
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network. In certain embodiments, the gNB 103 is a non-terrestrial BS. For example, gNB 103 can be a satellite positioned in a geosynchronous equatorial orbit (geostationary orbit, GEO) or in a low earth orbit (LEO).

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The coverage area 125 provided by gNB 103 can be part of a non-terrestrial network (NTN). The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for flexible quality of service control for diverse networks. In certain embodiments, and one or more of the gNBs 101-103 includes circuitry, programing, or a combination thereof for flexible quality of service control for diverse networks.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 103 according to embodiments of the present disclosure. The embodiment of the gNB 103 illustrated in FIG. 2 is for illustration only, and the gNBs 101 and 102 of FIG. 1 could have the same or similar configuration. However, gNBs come in a wide variety of configurations, and FIG. 2 does not limit the scope of this disclosure to any particular implementation of a gNB.

As shown in FIG. 2, the gNB 103 includes multiple antennas 205a-205n, multiple RF transceivers 210a-210n, transmit (TX) processing circuitry 215, and receive (RX) processing circuitry 220. The gNB 103 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 103. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 103 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 103 to communicate with other devices or systems over a backhaul connection or over a network. The interface 235 could support communications over any suitable wireless connection(s). When disposed as part of a terrestrial network, such as gNB 101 and gNB 102, The interface 235 could support communications over any suitable wired or wireless connection(s). For example, when the gNB 103 is implemented as part of a cellular communication system (such as one supporting 5G/NR, LTE, or LTE-A), the interface 235 could allow the gNB 103 to communicate with other gNBs over a wireless backhaul connection while gNB 101 and gNB 102 can communicate with other gNBs over a wired or wireless backhaul connection. When the one or the gNBs 101-103 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a flash memory or other ROM.

Although FIG. 2 illustrates one example of gNB 103, various changes may be made to FIG. 2. For example, the gNB 103, and respectively gNB 101 and 102 as part of terrestrial networks, could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4A:
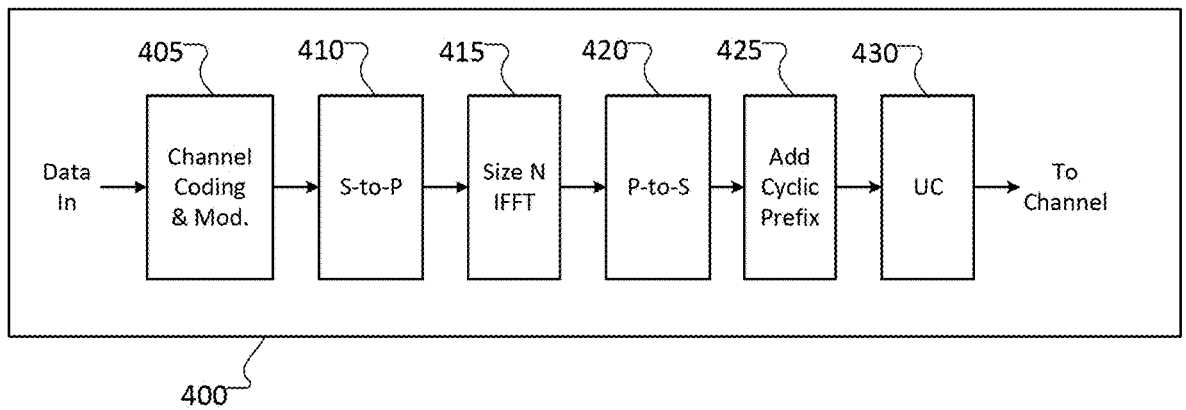
FIGS. 4A and 4B illustrate example wireless transmit and receive paths according to this disclosure.
Figure 4B:
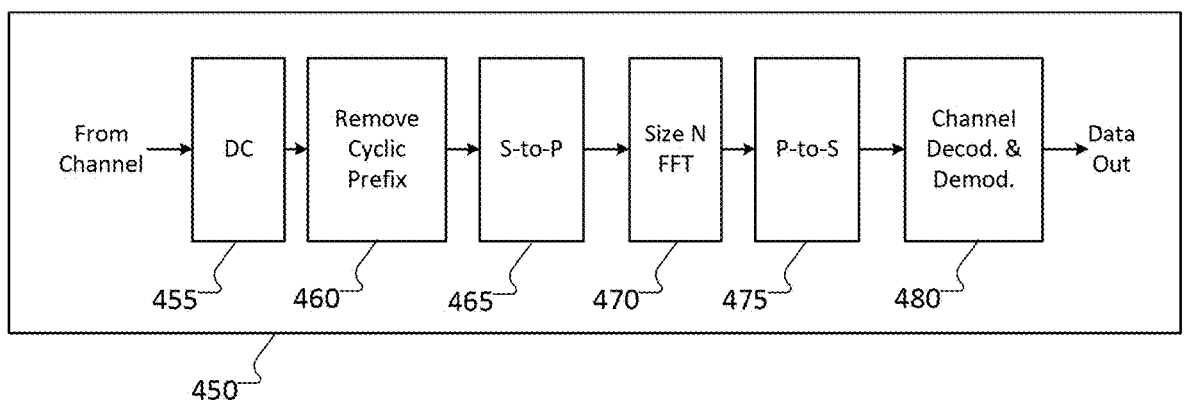

FIG. 4A and FIG. 4B illustrate example wireless transmit and receive paths according to this disclosure. In the following description, a transmit path 400 may be described as being implemented in a gNB (such as the gNB 102), while a receive path 450 may be described as being implemented in a UE (such as a UE 116). However, it may be understood that the receive path 450 can be implemented in a gNB and that the transmit path 400 can be implemented in a UE. In some embodiments, the receive path 450 is configured to support adapting a channel sensing threshold as described in embodiments of the present disclosure.

The transmit path 400 as illustrated in FIG. 4A includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 450 as illustrated in FIG. 4B includes a down-converter (DC) 455, a remove cyclic prefix block 460, a serial-to-parallel (S-to-P) block 465, a size N fast Fourier transform (FFT) block 470, a parallel-to-serial (P-to-S) block 475, and a channel decoding and demodulation block 485.

As illustrated in FIG. 4A, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time domain signals. The size N FFT block 470 performs an FFT algorithm to generate N parallel frequency-domain signals. The parallel-to-serial block 475 converts the parallel frequency-domain signals to a sequence of modulated data symbols. The channel decoding and demodulation block 485 demodulates and decodes the modulated symbols to recover the original input data stream.

Each of the gNBs 101-103 may implement a transmit path 400 as illustrated in FIG. 4A that is analogous to transmitting in the downlink to UEs 111-116 and may implement a receive path 450 as illustrated in FIG. 4B that is analogous to receiving in the uplink from UEs 111-116. Similarly, each of UEs 111-116 may implement the transmit path 400 for transmitting in the uplink to the gNBs 101-103 and may implement the receive path 450 for receiving in the downlink from the gNBs 101-103.

Each of the components in FIG. 4A and FIG. 4B can be implemented using only hardware or using a combination of hardware and software/firmware. As a particular example, at least some of the components in FIG. 4A and FIG. 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4A and FIG. 4B illustrate examples of wireless transmit and receive paths, various changes may be made to FIG. 4A and FIG. 4B. For example, various components in FIG. 4A and FIG. 4B can be combined, further subdivided, or omitted and additional components can be added according to particular needs. Also, FIG. 4A and FIG. 4B are meant to illustrate examples of the types of transmit and receive paths that can be used in a wireless network. Any other suitable architectures can be used to support wireless communications in a wireless network.

Figure 5:
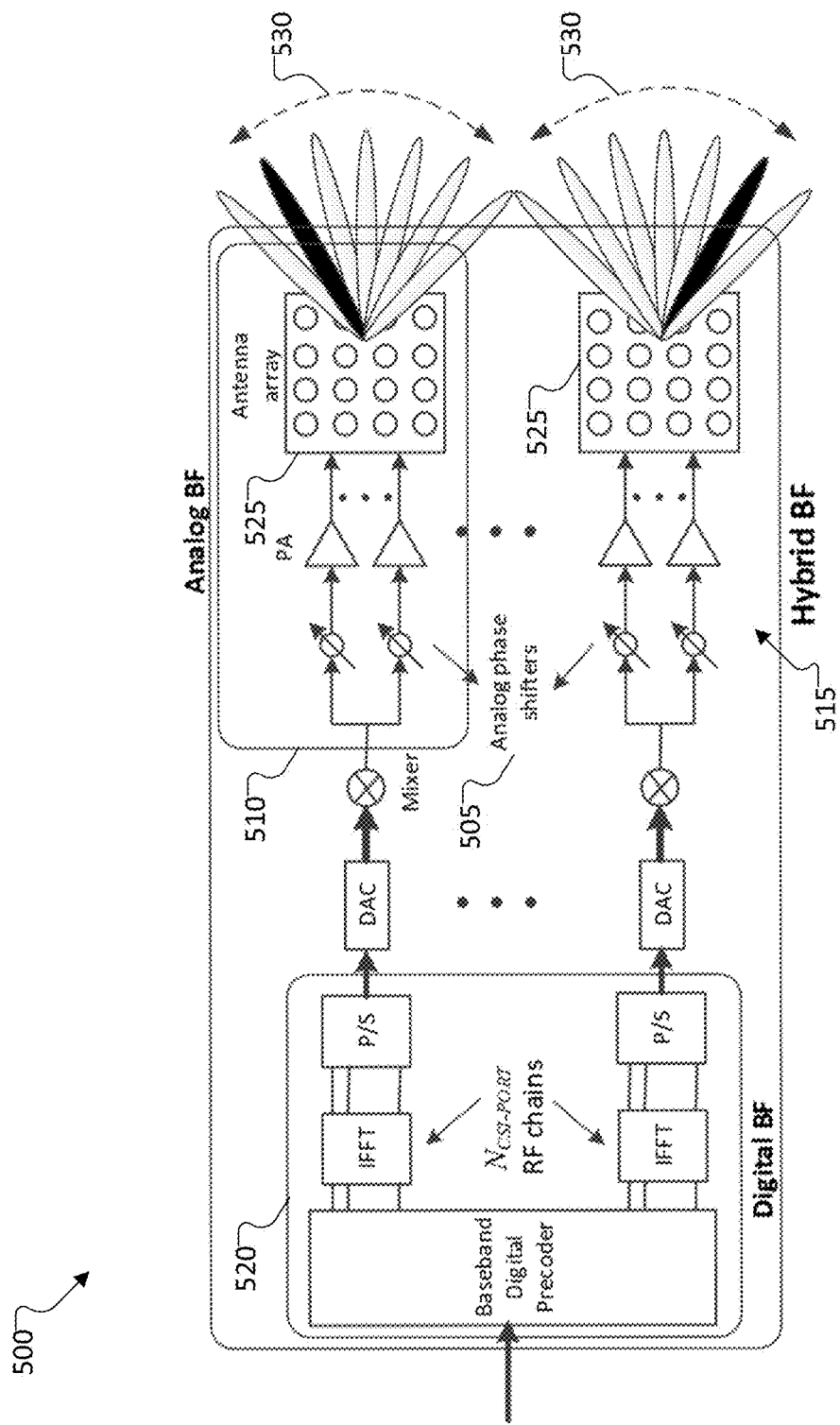
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI-PORT}$. A digital BF 515 performs a linear combination across $N_{CSI-PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4). In this case, the system can employ only analog beams. Due to the $O_2$ absorption loss around 60 GHz frequency (~10 decibels (dB) additional loss @100 m distance), larger number of and sharper analog beams (hence larger number of radiators in the array) will be needed to compensate for the additional path loss.

Figure 6:
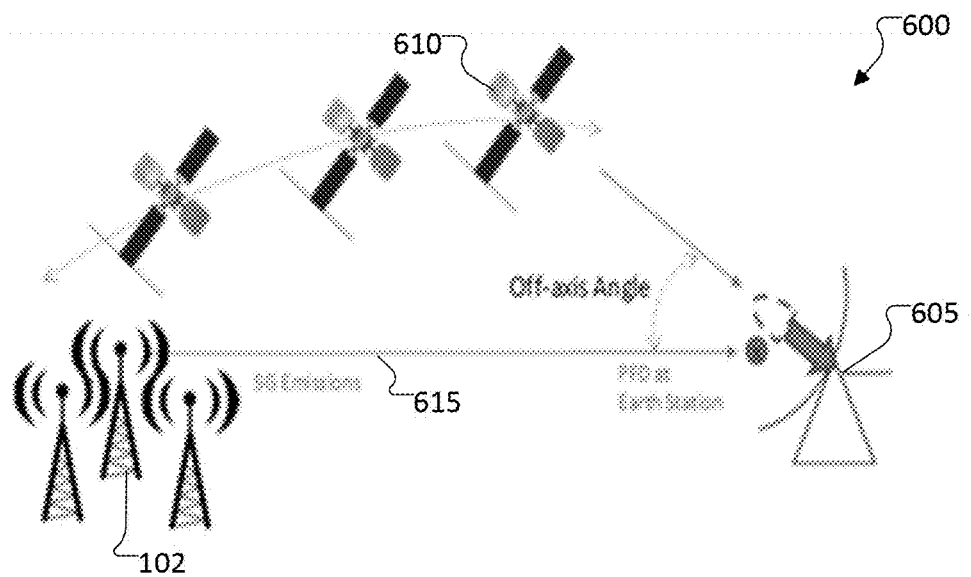
FIG. 6 illustrates an example wireless communications network having terrestrial and non-terrestrial stations according to embodiments of the present disclosure.

FIG. 6 illustrates an example wireless communications network having terrestrial and non-terrestrial stations according to embodiments of the present disclosure. The embodiment of the network 600 shown in FIG. 6 is for illustration only. Other embodiments could be used without departing from the scope of the present disclosure.

In many cases, cellular networks are deployed in locations where satellite earth-stations (ES) 605 exist. In the present disclosure, one or multiple approaches described below can be implemented to realize the concept for diverse networks including a non-terrestrial network (NTN) and a high-capacity network. In certain embodiments, for the NTN architecture, gNB 103 comprises a gNB-distributed unit (gNB-DU) disposed on the satellite 610 and a gNB-centralized unit (gNB-CU) disposed on the ES 605. In such case, the gNB-CU on the ES 605 can control the amount of data being sent to the gNB-DU on the satellite 610 based on gNB-DU memory capabilities. In an implementation-specific manner, the gNB-CU on the ES 605 can take care most of the storage (e.g., at the packet data convergence protocol (PDCP) layer) to alleviate any significant memory requirements on the gNB-DU.

Cellular operation bands, such as via gNB 102, can be adjacent to ES 605 operation band. For example, 5G emission 615 from gNB 102 can interfere with communications from the on the ES 605. Additionally, there are harsh constraints on the amount of interference that 605 can tolerate in their band of operation. Even though cellular networks are operating in a different adjacent band, out of band (OOB) emission still affects ES 605, hence, transmission power back-off may be required in some cases to avoid OOB interference.

In certain scenarios, to mitigate OOB interference, gNB 102 may perform power reduction. In response, ES 605 continues to measure the interference while gNB 102 continues to reduce the power so that the interference coming from gNB 102 would comply with the regulations.

In certain situations, if gNB 102 only reduces the power, for example, if gNB 102 transmits 40 decibels (dB), the received power is 25 dB. A problem with this power back off is that it deteriorates the through-put or performance. That is, reducing the power to reduce the interference may affect the performance of the system as well.

Figure 7:
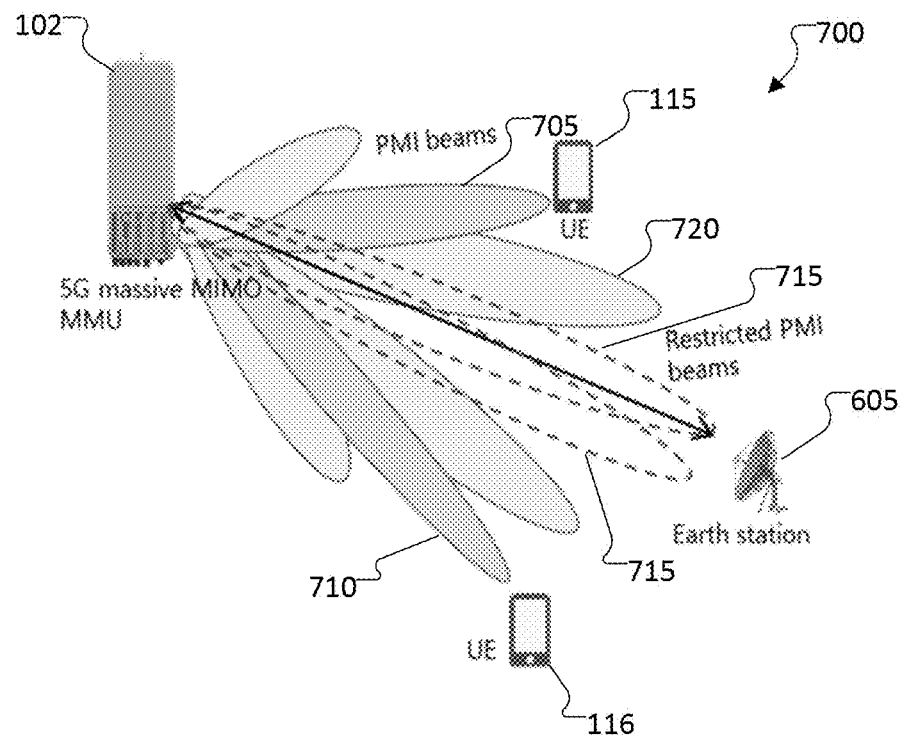
FIG. 7 illustrates an example 5G massive multiple input multiple output beams according to embodiments of the present disclosure.

FIG. 7 illustrates an example 5G massive multiple input multiple output (MIMO) beams according to embodiments of the present disclosure. The embodiment of the 5G massive MIMO unit (MMU) beams 700 shown in FIG. 7 is for illustration only. Other embodiments could be used without departing from the scope of the present disclosure.

In the example shown in FIG. 7, a precoding matrix indicator (PMI) restriction is illustrated. A 5G MMU, such as gNB 102, transmits beams to UE 115. The gNB 102 transmits the beams based on the codebook in gNB 102. The codebook indicates which beams that gNB 102 will use to communicate with UE 115. UE 115 transmits a feedback signal to gNB 102 informing gNB 102 the best direction for transmission to UE 115. In response, gNB 102 will apply some beam forming and direct the power in a direction, such as that a first beam 705 servers UE 115 and a second beam 710 serves UE 116.

Since gNB 102 knows the direction of the beams 705, 710 based on its codebook, then gNB 102 can just restrict some of the beams 715 to not be transmitted. That is gNB 102 selects not to transmits beams 715, which would be the beams 715 that would be in the direction of, or interfering with, ES 605. As such, gNB 102 restricts any codeword that would make gNB 102 transmit a beam 715 in the direction of ES 605. Accordingly, gNB 102 instructs UE 115 and UE 116 to report a beam in any direction other than the direction of restricted beams 715. So if there is a user here. UE 115 and UE 116 cannot choose the direction of restricted beams 715 because gNB 102 has informed UE 115 and UE 116 that this direction is restricted. In response, UE 115 and UE 116 will choose a second best if the best beam matches the restricted beams 715.

The PMI restriction does not address a scenario in which UE 115 receives more that a single beam 705. That is, in certain scenarios, UE 115 receives multiple streams from gNB 102. The use of multiple beams by gNB 102 for a single UE 115 is referred to as rank. For example, gNB 102 can transmit a Rank-1 beam, Rank-2 beam, or both Rank-1 and Rank-2 beams. Rank-1 means that gNB 102 transmits the first layer to UE 115 and Rank-2 is the second layer to UE 115. As such, gNB 102 may not just send one stream of information UE 115; instead, gNB 102 can send two or three or four streams of information to UE 115.

In certain examples, UE 115 may include eight receive antennas. As such, gNB 102 can send up to eight streams to UE 115, and those eight streams may use different beams. With PMI restriction, for Rank-1 UEs, or if you transmit a single direction, then gNB 102 knows where the beam is going to point. If gNB 102 transmits in two directions; then those two directions are sent simultaneously. For example, if gNB 102 is sending in a direction of the first beam 705 and a third beam 720, the first beam 705 and third beam 720 may combine and produce a beam in the direction of the restricted beam 715.

Therefore, an issue with power reduction is that it deteriorates the overall network performance. Additionally, an issue with PMI restriction is that it is useful for Rank-1 users; but PMI restriction cannot be applied to any users that have more than Rank-1.

Embodiments of the present disclosure combine both power reduction and PMI restriction. Certain embodiments provide for a hybrid physical downlink shared channel (PDSCH). Hybrid refers to combining two technologies or combining power reduction and PMI restriction together depending upon the situation.

Figure 8:
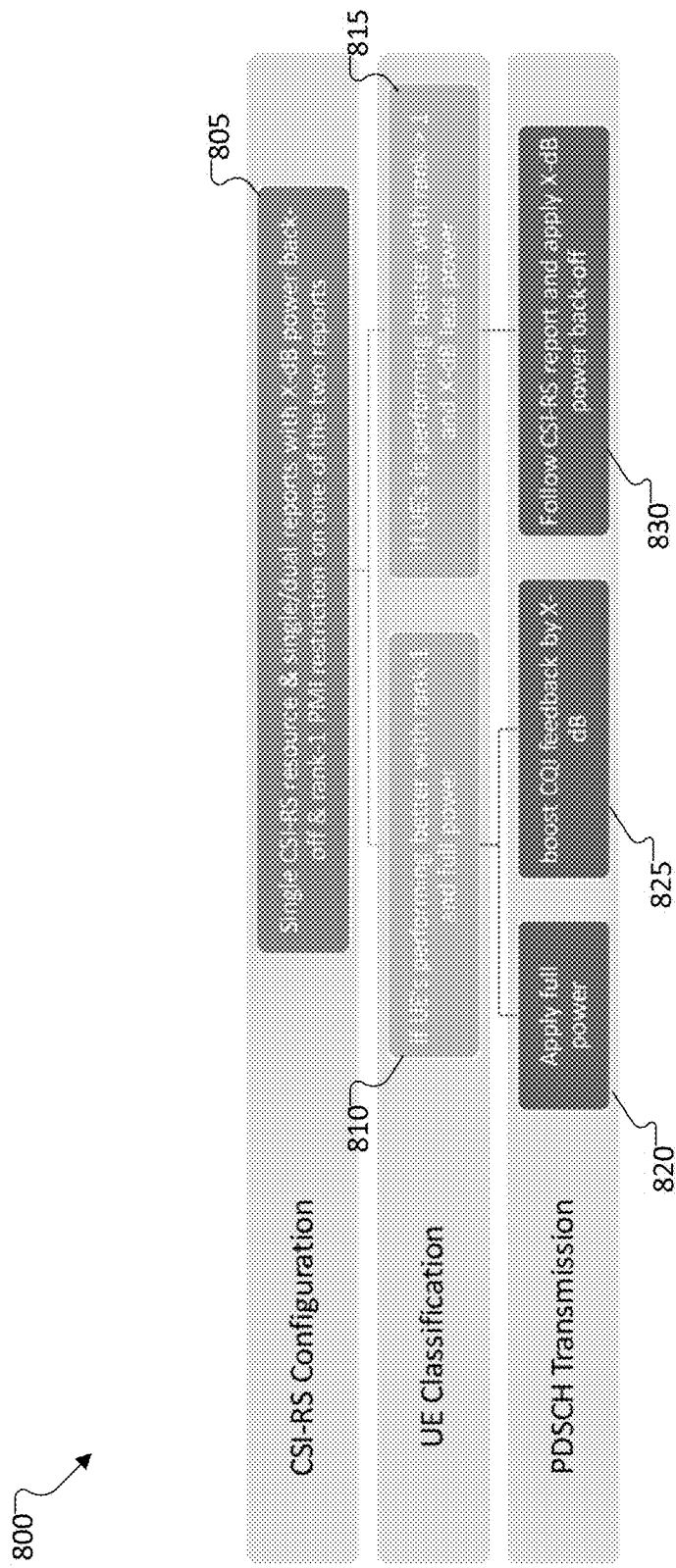
FIGS. 8-13 illustrate examples of a hybrid physical downlink shared channel according to embodiments of the present disclosure.

FIG. 8 illustrates an example hybrid physical downlink shared channel (PDSCH) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted in the example depicted is implemented by a processor and transmitter chain in, for example, a base station.

In certain embodiments, gNB 102 receives channel state information (CSI) report from UE 115 including precoding matrix indicator (PMI), rank indicator (RI) and channel quality indicator (CQI). Based on each UE's report, gNB 102 decides whether to use full-power transmission in PDSCH or apply some back-off percentage to transmission power. The goal is to guarantee the required interference level from OOB emission for ES 605 operating in neighboring band. This mixture operation is referred to as Hybrid PDSCH scheme. This is an alternative to applying the same power back-off for all UEs.

In certain embodiments, a Hybrid PDSCH is applied. In operation 805, a single CSI-RS resource is configured to all UEs in the network. When transmitting the CSI-RS signal, a predefined X-dB power back off is applied to CSI-RS transmission to avoid the OOB interference. In certain embodiments, one single CSI-RS measurement report is configured for UEs. In this measurement report, a restricted PMI bitmap based on offline calculations and restricted rank of 1 is configured. In certain embodiments, dual CSI-RS measurement reports are configured, among which one report is configured with restricted PMI bitmap while the other measurement report is configured with no restriction on PMI bitmap.

In a next stage of operation, a gNB receives CSI-RS report from each user. Due to the fact that rank-1 beams are guaranteed to be nulled efficiently of OOB interference based on PMI-restriction, then power back-off is not required for those users; therefore, this information of UE rank is used in UE classification phase. In the UE classification phase, gNB 102 determines whether UE 115 is performing better with rank-1 and full power in operation 810; or if UE 115 is performing better with higher ranks and X-db less power in operation 815.

In operation 810 for users performing better with rank-1 transmission, a full-power transmission of PDSCH is applied in operation 820, and the CQI in measurement report will be boosted in operation 825 with the same amount of back-off applied to CSI-RS resource set, as in the first step, XdB. This will cause modulation coding scheme (MCS) selection matching the full-power transmission instead of being conservative following CSI-RS power back-off.

In response to operation 815 for higher rank users, in operation 830, a same X-dB power back-off for PDSCH transmission is applied and the CQI reporting from CSI-RS report with unrestricted PMI bitmap will be used (either from the single report or in the case of dual report, then we use the information from the second report as it contains unrestricted PMIs). This way even though the higher-rank beam nulling is not performed in the direction of ES, the power back-off will guarantee the limitation of the interference level.

Figure 9:
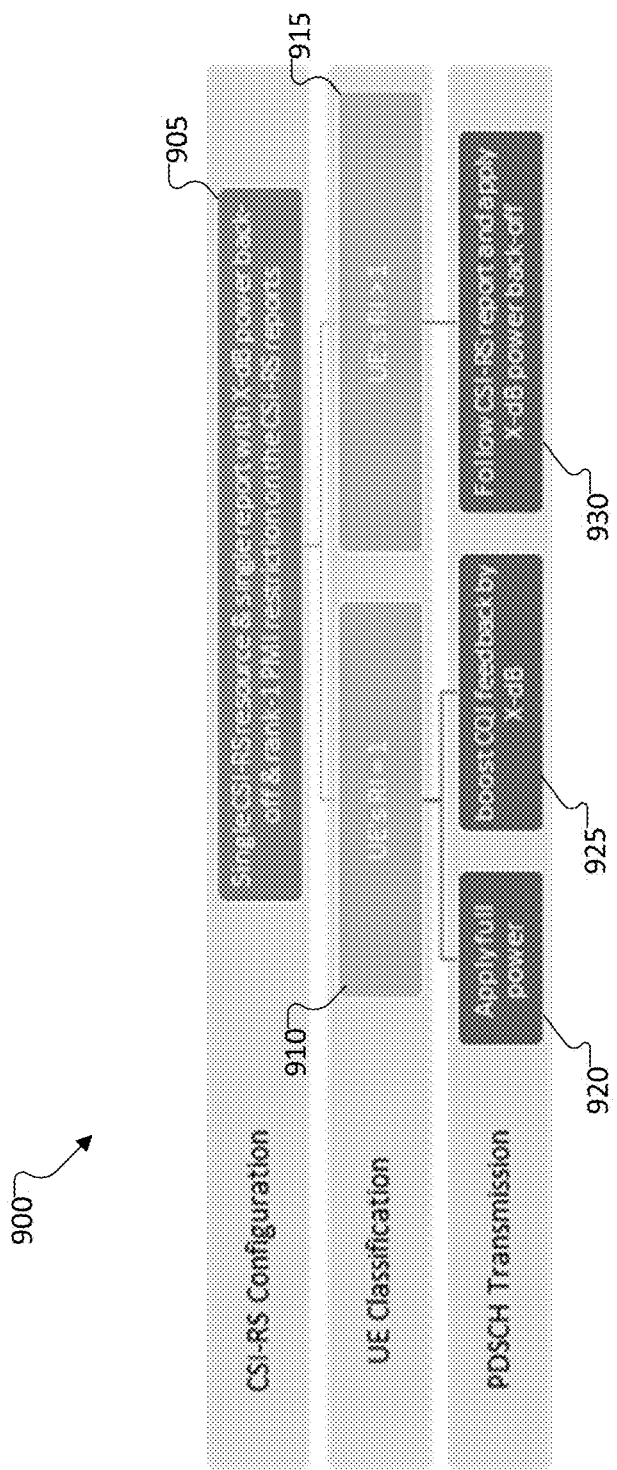

FIG. 9 illustrates another example hybrid physical downlink shared channel (PDSCH) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 900 depicted in the example depicted is implemented by a processor and transmitter chain in, for example, a base station.

In certain embodiments, in operation 905 all UEs are configured with a single CSI-RS report with PMI-restriction based on offline table configured. The RI feedback is utilized for users' classification. In the UE classification phase, gNB 102 determines whether UE 115 is performing better with rank-1 and full power in operation 910; or if UE 115 is performing better with higher ranks and X-db less power in operation 915. In response to operation 915 for users whose RI=1, in operation 920 gNB 102 applies PMI-restriction with full-power and CQI boosting in operation 925. In response to operation 915 for users whose RI>1, in operation 930 a CQI report with PDSCH power back-off with the same amount of CSI-RS power back-off (X-dB) is followed.

Figure 10:
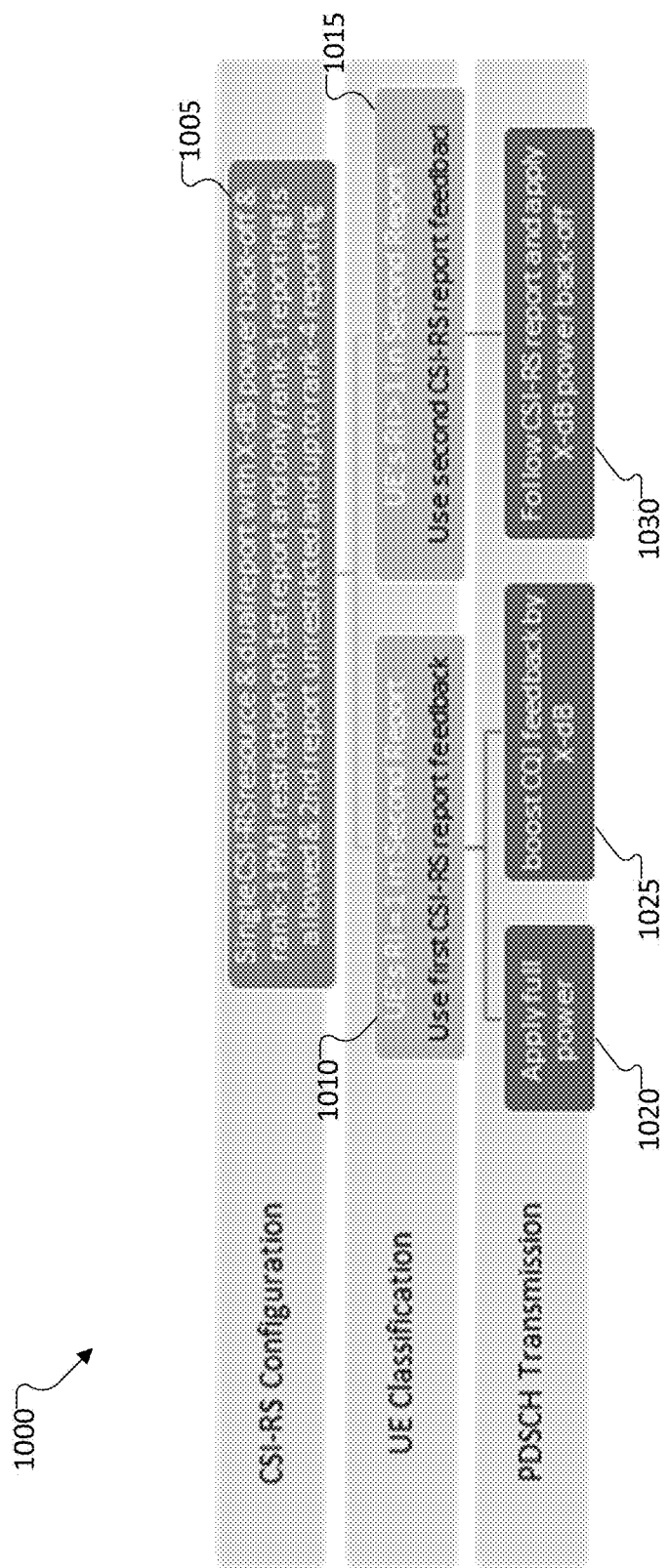

FIG. 10 illustrates another example hybrid physical downlink shared channel (PDSCH) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1000 depicted in the example depicted is implemented by a processor and transmitter chain in, for example, a base station.

In certain embodiments, all UEs are configured with two CSI-RS reports in operation 1005. That is, in operation 1005, a single CSI-RS resource & dual report with X-dB power back-off & rank-1 PMI restriction on $1^{st}$ report and only rank-1 reporting is allowed & $2^{nd}$ report unrestricted and up to rank-4 reporting. In the first report, in the process 800, feedback is limited to rank-1 only and rank-1 PMI-restriction based on offline table is used. The second CSI-RS report allows up to rank-4 reporting and does not have any restricted codewords. The RI feedback of the second CSI-RS report (the unrestricted report) is utilized for users' classification in the UE classification stage. In the UE classification phase, gNB 102 determines whether UE 115 is rank-1 in a second report uses first CSI-RS report feedback in operation 1010; or if UE 115 is performing better with higher ranks and uses a second CSI-RS report feedback in operation 1015.

In response to operation 1010 for users whose RI=1 in the second report, gNB 102 applies PMI-restriction (following PMI feedback from first CSI-RS report) with full-power in operation 1020 and CQI boosting to leverage the benefit of full-power transmission in operation 1025. In response to operation 1015 for users whose RI>1 on the second report, in operation 1030 gNB 102 follows the second report following its CQI report with PDSCH power back-off equal to the same amount of CSI-RS power back-off (X-dB).

Figure 11:
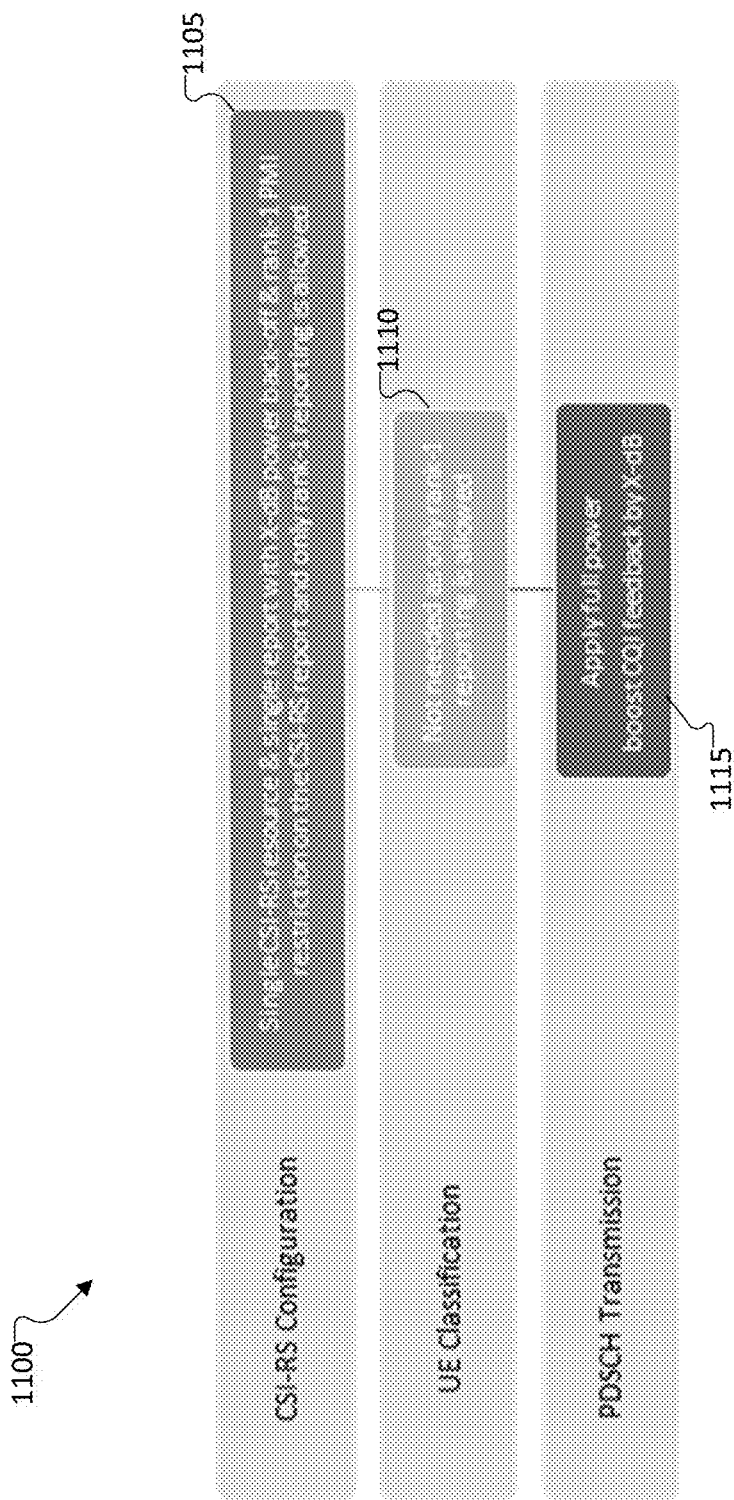

FIG. 11 illustrates another example hybrid physical downlink shared channel (PDSCH) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1100 depicted in the example depicted is implemented by a processor and transmitter chain in, for example, a base station.

In certain embodiments, a single CSI-RS report allowing only rank-1 reporting and applying rank-1 PMI-restriction in operation 1105. In this case, no UE classification stage is needed. That is, in operation 1110 UE classification is not performed because only rank-1 reporting is allowed. Therefore, in operation 1115, gNB 102 always follows the same procedure as RI=1, such as in operations 920 and 925 in FIG. 9.

Figure 12:
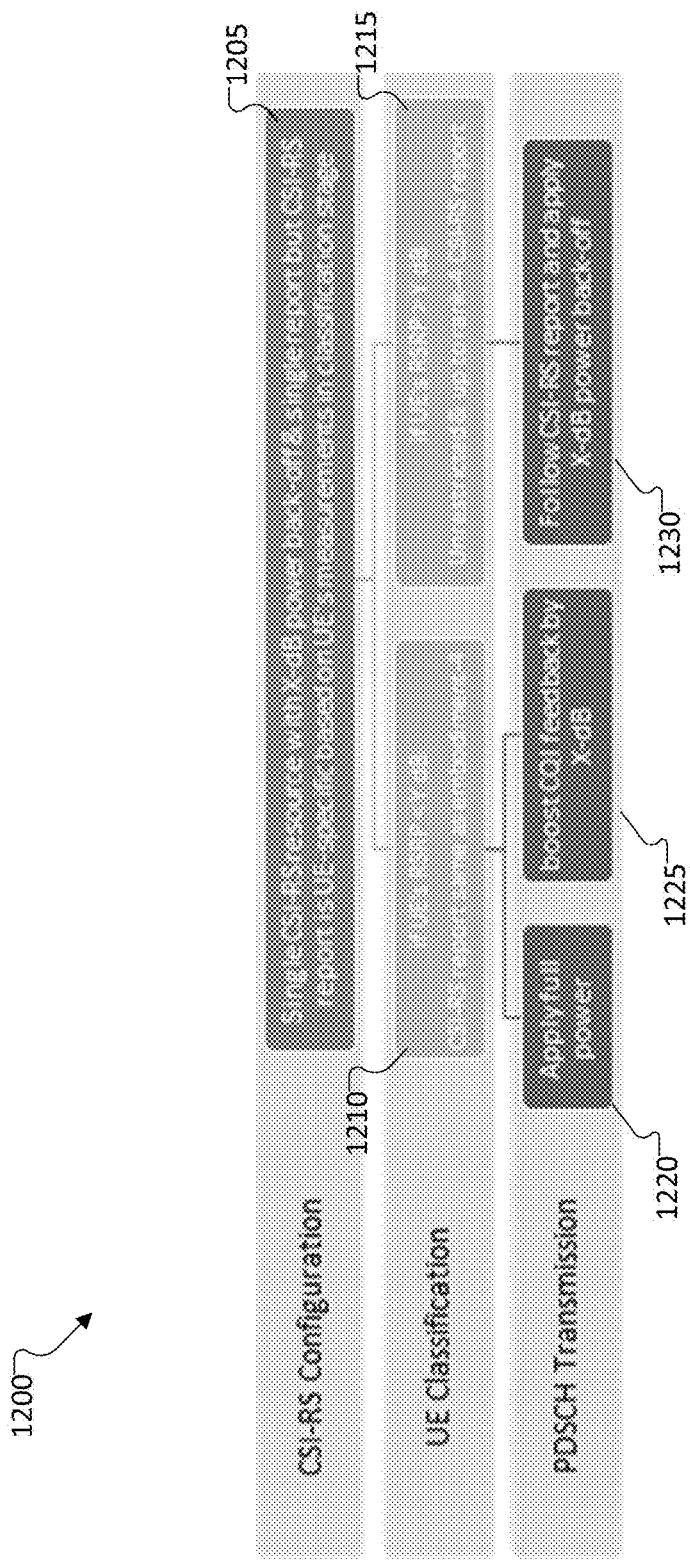

FIG. 12 illustrates another example hybrid physical downlink shared channel (PDSCH) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1200 depicted in the example depicted is implemented by a processor and transmitter chain in, for example, a base station.

In certain embodiments, in operation 1205 gNB 102 relies on UE's RSRP measurement to configure its CSI-RS reports. In the UE classification phase, gNB 102 determines whether UE 115 has an RSRP<Y dB (RSRP is lower than a threshold RSRP) and CSI-RS feedback report in operation 1210; or if UE 115 has an RSRP>Y dB and uses an unrestricted and up to rank-4 CSI-RS report feedback in operation 1215.

In response to operation 1210 for users whose RSRP is lower than a threshold RSRP, rank-1 PMI-restriction with full-power in operation 1220 and CSI-RS report is configured to be rank-1 restricted in operation 1225. In response to operation 1215 for users with larger than a threshold RSRP, in operation 1230 a CSI-RS report is configured allowing up to rank-4 reporting and no PMI-restriction is applied. PDSCH transmission stage is the same as in process 1000.

Figure 13:
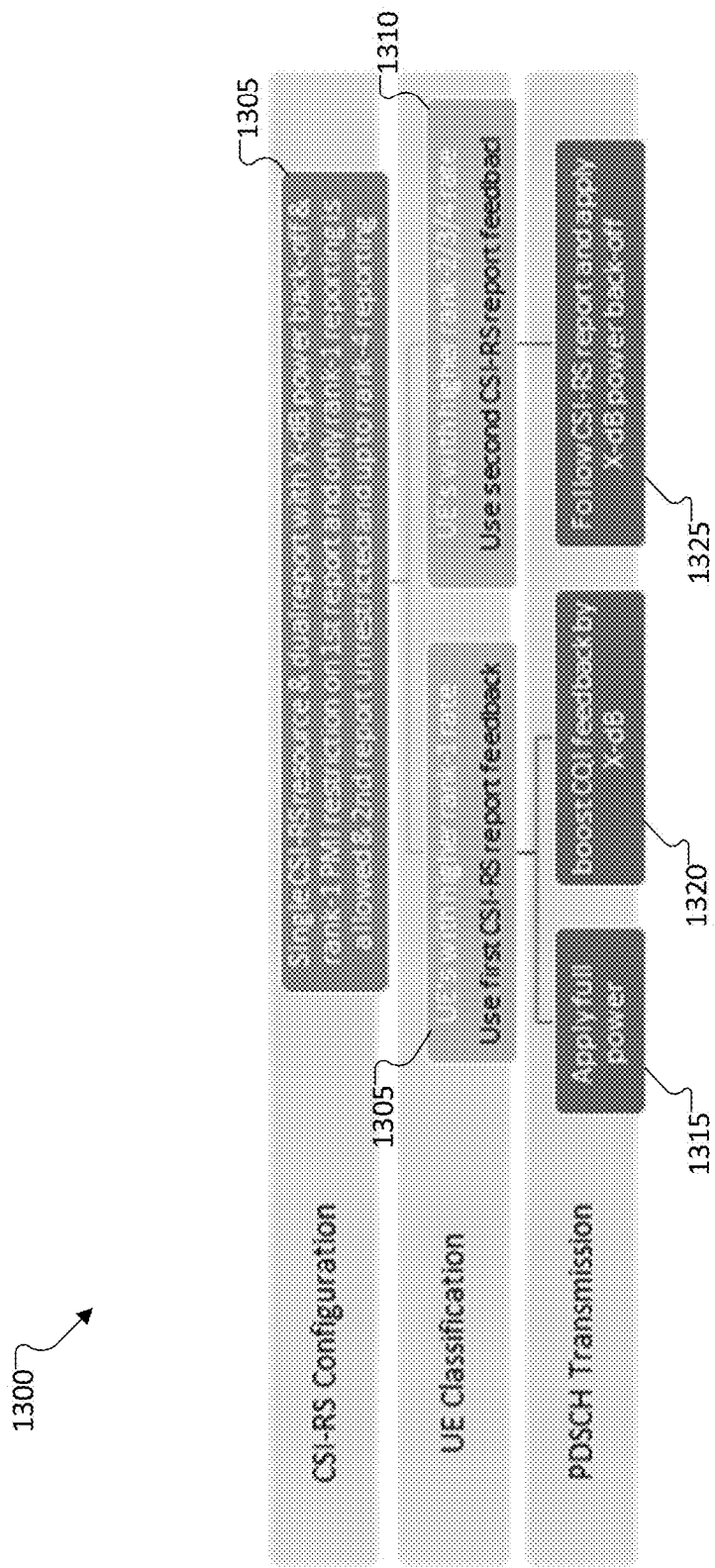

FIG. 13 illustrates another example hybrid physical downlink shared channel (PDSCH) according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1300 depicted in the example depicted is implemented by a processor and transmitter chain in, for example, a base station.

In certain embodiments, all UEs are configured with two CSI-RS reports in operation 1305. In the first report, gNB 102 limits feedback to rank-1 only and gNB 102 uses a rank-1 PMI-restriction based on offline table. While the second CSI-RS report allows up to rank-4 reporting and does not have any restricted codewords.

In the UE classification stage, gNB 102 calculates the achievable rate following the $1^{st}$ CSI-RS report in operation 1305 and re-calculates the achievable rate following the $2^{nd}$ CSI-RS report in operation 1310. If the first achievable rate is higher in operation 1305, then gNB 102 follows the $1^{st}$ CSI-RS report with full-power in PDSCH transmission in operation 1315 and CQI boosting with X-dB in operation 1320. If the second achievable rate (following the $2^{nd}$ CSI-RS report) is higher in operation 1310, then gNB 102 follows the $2^{nd}$ CSI-RS report with X-dB back-off in PDSCH transmission power in operation 1325.

One method of calculating the achievable rate is as follows:

$$R=RI*\log_2(1+SINR*\alpha) \quad (1)$$

In Equation 1, RI is the rank index, which is obtained from UE CSI feedback, SINR is the signal to interference plus noise ratio which is converted from channel quality index CQI that is further from the UE CSI RS report, in case of CQI boosting, the SINR is converted from boosted CQI, and $\alpha$ is the ORLC parameter.

Figure 14:
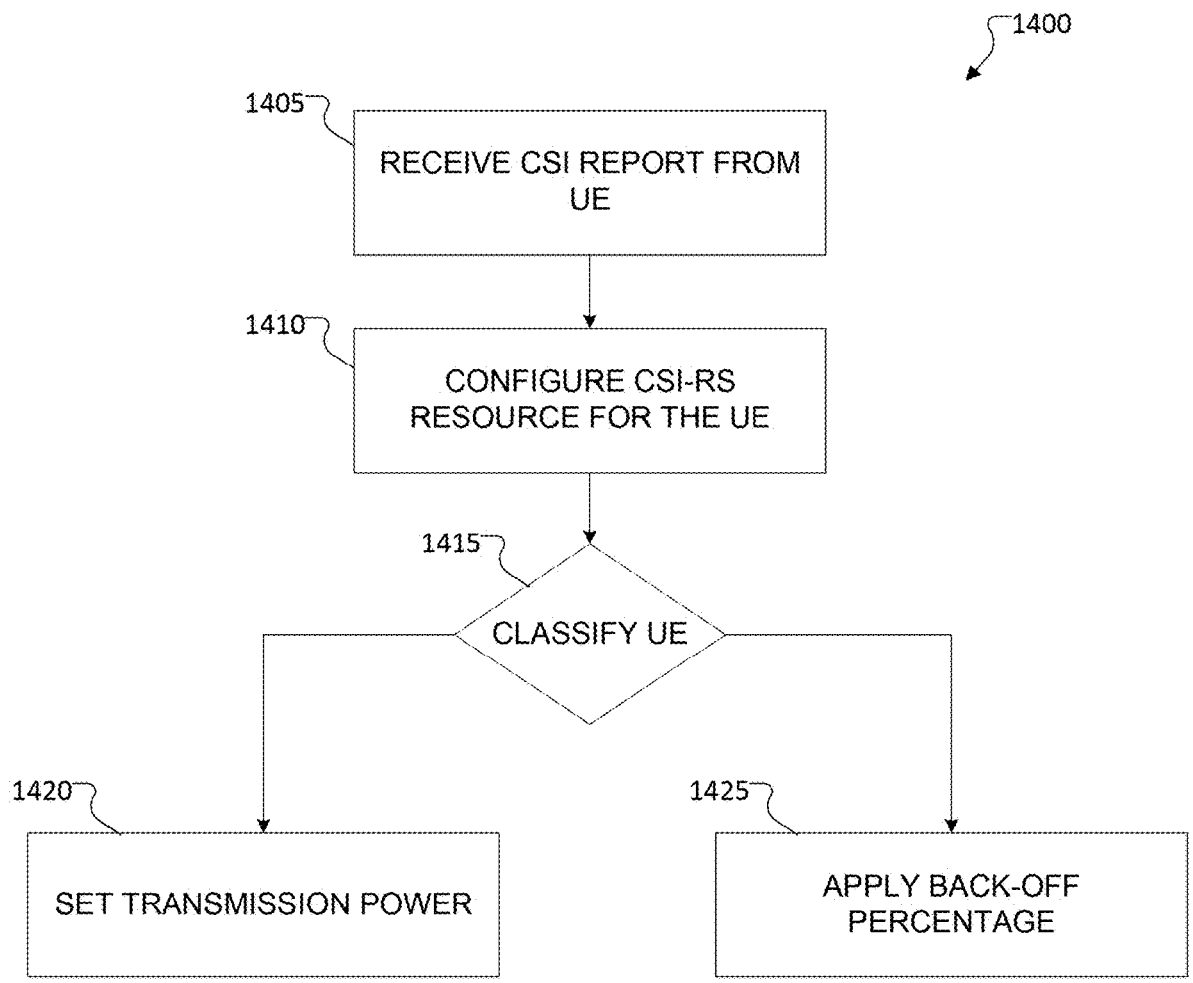
FIG. 14 illustrates a hybrid physical downlink shared channel process according to embodiments of the present disclosure.

FIG. 14 illustrates a hybrid physical downlink shared channel (PDSCH) process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1400 depicted in the example depicted is implemented by a processor and transmitter chain in, for example, a base station.

In operation 1405, the base station receives a CSI report from at least one UE. Based on the received CSI report, in operation 1410, the base station configures the CSI-RS resource for the UE. Based on a determination of the UE classification in operation 1415, the base station either: 1) sets a transmission power to full power for transmission in a physical downlink shared channel (PDSCH) in operation 1420; or 2) applies a back-off percentage to the transmission power in the PDSCH in operation 1425.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station (BS) in a wireless communication system, the BS comprising:
a transceiver; and
a processor configured to:
receive, via the transceiver, a channel state information (CSI) report from at least one user equipment (UE);
configure CSI—reference signal (RS) resources for at least one user equipment (UE); and
based on the CSI report from the at least one UE and a classification including a layer of the at least one UE to receive multiple beams, perform one of operations to:
set a transmission power to full power for a physical downlink shared channel (PDSCH) transmission; or
apply a back-off percentage to the transmission power in the PDSCH transmission, wherein the classification is determined based on an achievable rate comprising a first achievable rate associated with a first CSI-RS report and a second achievable rate associated with a second CSI-RS report that are compared to identify a level of power in the PDSCH transmission.

2. The BS of claim 1, wherein the CSI report from the at least one UE comprises one or more of:
a precoding matrix indicator (PMI),
a rank indicator (RI), and
a channel quality indicator (CQI).

3. The BS of claim 2, wherein, to perform setting the full power or applying the back-off percentage, the processor is further configured to:
determine the layer of the at least one UE included in the classification of the at least one UE, the layer being identified based on a number of beams that the at least one UE receives from the BS.

4. The BS of claim 3, wherein the classification of the at least one UE comprises one of:
the at least one UE performing with a rank-1; or
the at least one UE performing with a rank-2 or greater.

5. The BS of claim 4, wherein:
the at least one UE performing with the rank-1 further comprises a transmission at the full power; and
the at least one UE performing with the rank-2 or greater further comprises a transmission at power less than the full power.

6. The BS of claim 3, wherein, when the at least one UE performs with a rank-1, the processor is further configured to:
set the transmission power to the full power and boost a channel quality indicator (CQI).

7. The BS of claim 3, wherein, when the at least one UE performs with a rank-2 or greater, the processor is further configured to:
follow the CSI report and apply the back-off percentage to the transmission power.

8. The BS of claim 3, wherein the achievable rate is calculated according to:

$$\text{Rate}=RI*\log_2(1+\alpha*\text{SINR})$$

where the $\alpha$ is an outer loop control parameter and the SINR is a signal to interference plus noise ratio that is converted from the CQI, and
wherein:
when the first achievable rate is higher than the second achievable rate, then the first CSI-RS report is used with the full power in the PDSCH transmission and a CQI boosting, and
when the second achievable rate following the second CSI-RS report is higher than the first achievable rate, then the second CSI-RS report is used with back-off power in the PDSCH transmission.

9. The BS of claim 3, wherein the achievable rate is calculated according to:
when a reference signal received power (RSRP) is lower than a threshold, the CSI report is configured to be rank-1 restricted and rank-1 PMI-restriction is applied; and
when the RSRP is greater than a threshold, the CSI report is configured to allow up to rank-4 reporting and no PMI-restriction is applied.

10. A method of a base station (BS), the method comprising:
receiving, via a transceiver, a channel state information (CSI) report from at least one user equipment (UE);
configuring CSI—reference signal (RS) resources for the at least one UE; and
based on the CSI report from the at least one UE and a classification including a layer of the at least one UE to receive multiple beams, performing one of:
setting a transmission power to full power for a physical downlink shared channel (PDSCH) transmission; or
applying a back-off percentage to the transmission power in the PDSCH transmission, wherein the classification is determined based on an achievable rate comprising a first achievable rate associated with a first CSI-RS report and a second achievable rate associated with a second CSI-RS report that are compared to identify a level of power in the PDSCH transmission.

11. The method of claim 10, wherein the CSI report from the at least one UE comprises one or more of:
a precoding matrix indicator (PMI),
a rank indicator (RI), and
a channel quality indicator (CQI).

12. The method of claim 11, wherein performing setting the full power or applying the back-off percentage comprises:
determining the layer of the at least one UE included in the classification of the at least one UE, the layer being identified based on a number of beams that the at least one UE receives from the BS.

13. The method of claim 12, wherein the classification of the at least one UE comprises one of:
the at least one UE performing with a rank-1; or
the at least one UE performing with a rank-2 or greater.

14. The method of claim 13, wherein:
the at least one UE performing with the rank-1 further comprises a transmission at the full power; and
the at least one UE performing with the rank-2 or greater further comprises a transmission at power less than the full power.

15. The method of claim 12, wherein, when the at least one UE performs with a rank-1, further comprising:

setting the transmission power to the full power and boost a channel quality indicator (CQI).

16. The method of claim 12, wherein, when the at least one UE performs with a rank-2 or greater, further comprising:
following the CSI report and applying the back-off percentage to the transmission power.

17. The method of claim 12, wherein the achievable rate is calculated according to:

$$\text{Rate}=RI^*\log_2(1+\alpha^*\text{SINR})$$

where the α is an outer loop control parameter and the SINR is a signal to interference plus noise ratio that is converted from the CQI, and
wherein:
when the first achievable rate is higher than the second achievable rate, then the first CSI-RS report is used with the full power in the PDSCH transmission and a CQI boosting, and
when the second achievable rate following the second CSI-RS report is higher than the first achievable rate, then the second CSI-RS report is used with back-off power in the PDSCH transmission.

18. The method of claim 12, wherein the classification of the at least one UE is determined based on an achievable rate calculated according to:
when a reference signal received power (RSRP) is lower than a threshold, the CSI report is configured to be rank-1 restricted and rank-1 PMI-restriction is applied; and
when the RSRP is greater than a threshold, the CSI report is configured to allow up to rank-4 reporting and no PMI-restriction is applied.

19. A non-transitory computer readable medium comprising instructions that, when executed by at least one processor, cause the at least one processor to:
receive a channel state information (CSI) report from at least one user equipment (UE);
configure CSI—reference signal (RS) resources for the at least one UE; and
based on the CSI report from the at least one UE and a classification including a layer of the at least one UE to receive multiple beams, perform one of operations to:
set a transmission power to full power for a physical downlink shared channel (PDSCH) transmission; or
apply a back-off percentage to the transmission power in the PDSCH transmission, wherein the classification is determined based on an achievable rate comprising a first achievable rate associated with a first CSI-RS report and a second achievable rate associated with a second CSI-RS report that are compared to obtain to identify a level of power in the PDSCH transmission.

20. The non-transitory computer readable medium of claim 19, wherein the CSI report from the at least one UE comprises one or more of:
a precoding matrix indicator (PMI),
a rank indicator (RI), and
a channel quality indicator (CQI).

21. The non-transitory computer readable medium of claim 20, wherein to set the full power or apply the back-off percentage, the instructions are further configured to cause the at least one processor to:
determine the layer of the at least one UE included in the classification of the at least one UE, the layer being identified based on a number of beams that the at least one UE receives from a base station.

22. The non-transitory computer readable medium of claim 21, wherein the classification of the at least one UE comprises one of:
the at least one UE performing with a rank-1; or
the at least one UE performing with a rank-2 or greater.

23. The non-transitory computer readable medium of claim 22, wherein:
the at least one UE performing with the rank-1 further comprises a transmission at the full power; and
the at least one UE performing with the rank-2 or greater further comprises a transmission at power less than the full power.

24. The non-transitory computer readable medium of claim 21, wherein, when the at least one UE performs with a rank-1, the instructions are further configured to cause the at least one processor to:
set the transmission power to the full power and boost a channel quality indicator (CQI).

25. The non-transitory computer readable medium of claim 21, wherein, when the at least one UE performs with a rank-2 or greater, the instructions are further configured to cause the at least one processor to:
follow the CSI report and apply the back-off percentage to the transmission power.

26. The non-transitory computer readable medium of claim 21, wherein the achievable rate is calculated according to:

$$\text{Rate}=RI^*\log_2(1+\alpha^*\text{SINR})$$

where the α is an outer loop control parameter and the SINR is a signal to interference plus noise ratio that is converted from the CQI, and
wherein:
when the first achievable rate is higher than the second achievable rate, then the first CSI-RS report is used with the full power in the PDSCH transmission and a CQI boosting, and
when the second achievable rate following the second CSI-RS report is higher than the first achievable rate, then the second CSI-RS report is used with back-off power in the PDSCH transmission.

27. The non-transitory computer readable medium of claim 21, wherein the achievable rate is calculated according to:
when a reference signal received power (RSRP) is lower than a threshold, the CSI report is configured to be rank-1 restricted and rank-1 PMI-restriction is applied; and
when the RSRP is greater than a threshold, the CSI report is configured to allow up to rank-4 reporting and no PMI-restriction is applied.

* * * * *